(12) United States Patent
Budge (10) Patent No.: US 9,707,812 B2
(45) Date of Patent: Jul. 18, 2017

(54) TRAILER COUPLER LOCK

(71) Applicant: Paul W. Budge, St. George, UT (US)

(72) Inventor: Paul W. Budge, St. George, UT (US)

( * ) Notice: Subject to any disclaimer, the term of this patent is extended or adjusted under 35 U.S.C. 154(b) by 186 days.

(21) Appl. No.: 14/527,566

(22) Filed: Oct. 29, 2014

(65) Prior Publication Data

US 2016/0121672 A1 May 5, 2016

(51) Int. Cl.
*B60D 1/60* (2006.01)
*E05B 67/18* (2006.01)
*B60D 1/06* (2006.01)

(52) U.S. Cl.
CPC ........ *B60D 1/60* (2013.01); *B60D 1/06* (2013.01)

(58) Field of Classification Search
CPC .. B60D 1/60; B60D 1/06; B60D 1/065; E05B 67/14; E05B 67/18
USPC .......... 280/507; 70/41, 44, 237, 258; 74/503
See application file for complete search history.

(56) References Cited

U.S. PATENT DOCUMENTS

| | | | |
|---|---|---|---|
| 2,571,349 A | 10/1951 | Eckles | |
| 3,391,555 A | 7/1968 | Mamo | |
| 3,605,457 A | 9/1971 | Foster | |
| 4,576,021 A | 3/1986 | Holden | |
| 5,433,468 A | 7/1995 | Dixon | |
| 6,062,583 A | 5/2000 | Lauricella, Jr. | |
| 6,405,569 B1 | 6/2002 | Kite | |
| 6,412,314 B1 | 7/2002 | Jenks | |
| 6,637,765 B2 | 10/2003 | Barton | |
| 6,644,071 B2 | 11/2003 | Gilbertson et al. | |
| 6,722,686 B2 | 4/2004 | Koy | |
| 7,121,121 B2 | 10/2006 | Wyers | |
| 7,264,261 B2 * | 9/2007 | Konsela | B60D 1/02 280/416.1 |
| 7,712,763 B2 | 5/2010 | Lovenberg | |
| 7,762,735 B2 | 7/2010 | Clayton, III et al. | |
| 8,596,665 B2 * | 12/2013 | Scharmuller | B60D 1/06 280/507 |
| 2012/0318028 A1 * | 12/2012 | Hahn | E05B 67/063 70/41 |

FOREIGN PATENT DOCUMENTS

WO 9809832 A1 3/1998

* cited by examiner

*Primary Examiner* — Anne Marie Boehler
(74) *Attorney, Agent, or Firm* — Kunzler Law Group (57) ABSTRACT

Disclosed is a lock apparatus for a trailer coupler. The lock apparatus includes a base that has a socket engagement feature that is receivable within a trailer coupler socket. The base of the lock apparatus further includes a locking assembly that has a locking mechanism, a user interface operable to actuate the locking mechanism, and a first and a second rotatable member coupled to the locking mechanism. A rotational axis extends through the first and second rotatable members. The lock apparatus further includes a pivoting shackle that has a middle section disposed between a first end section and a second end section, with the first end section being coupled to the first rotatable member and the second end section being coupled to the second rotatable member. The pivoting shackle is pivotable about the rotational axis between at least a locked position and an unlocked position.

20 Claims, 8 Drawing Sheets

TRAILER COUPLER LOCK

FIELD

This disclosure relates generally to locking devices and more particularly relates to trailer coupler locks.

BACKGROUND

Unhitched trailers are highly susceptible to theft. Most trailers have a trailer coupler that includes a ball socket for connecting to a corresponding ball hitch on the rear of a truck or pick up. Accordingly, a thief may, for example, connect the ball hitch of his/her towing vehicle to the trailer coupler socket of an unhitched an unattended trailer. The thief may then proceed to drive off with the stolen trailer. While certain devices exist to prevent thieves from stealing unhitched and unattended trailers, most of these conventional devices are time-consuming to use, lack adaptability in engaging with and locking to a plurality of different trailer coupler sockets, and/or easily disengageable/breakable.

SUMMARY

The subject matter of the present application has been developed in response to the present state of the art, and in particular, in response to the problems and needs associated with trailer coupler locks that have not yet been fully solved by currently available devices. Accordingly, the subject matter of the present application has been developed to provide a lock apparatus for trailer couplers, and associated systems and methods, that overcomes at least some of the above-discussed shortcomings of the prior art.

Disclosed herein, according to one embodiment, is a lock apparatus for a trailer coupler. The lock apparatus includes a base that has a socket engagement feature that is receivable within a trailer coupler socket. The base of the lock apparatus further includes a locking assembly that has a locking mechanism, a user interface operable to actuate the locking mechanism, and a first and a second rotatable member coupled to the locking mechanism. A rotational axis extends through the first and second rotatable members. The lock apparatus further includes a pivoting shackle that has a middle section disposed between a first end section and a second end section, with the first end section being coupled to the first rotatable member and the second end section being coupled to the second rotatable member. The pivoting shackle is pivotable about the rotational axis between at least a locked position and an unlocked position.

According to one implementation, the rotational axis is substantially non-parallel to a longitudinal axis of the trailer coupler. In such an implementation, the pivoting shackle has a front profile, as visible from a perspective looking substantially perpendicular to the rotational axis and substantially parallel to the longitudinal axis of the trailer coupler, with the front profile of the pivoting shackle having a "U" shape. In an alternative implementation, the pivoting shackle includes a front profile, as visible from a perspective looking substantially perpendicular to the rotational axis and substantially parallel to the longitudinal axis of the trailer coupler, that has a contour shape that substantially contours an exterior surface of the trailer coupler socket.

In one implementation, the pivoting shackle includes a side profile, as visible from a perspective looking substantially parallel to the rotational axis, that is "L" shaped. In another implementation, at least the middle section of the pivoting shackle includes an engagement surface that is adapted to engage an exterior surface of the trailer coupler socket. In one implementation, the locking mechanism is integrated within the base. In yet another implementation, the locking mechanism may include a ratchet-type structure that is lockable in a plurality of positions. The locking mechanism may be selected from the group that includes a pin tumbler lock, a combination lock, a warded lock, a wafer tumbler lock, disc tumbler lock, and a lever tumbler lock. Further, the user interface may be selected form the group that includes a key-hole, a combination, a key-card, an RFID card, and NFC device, a biometric sensor, a security token, and a touch-screen.

Further disclosed herein is one embodiment of a trailer coupler locking system. The trailer coupler locking system includes a trailer that has a trailer coupler with a trailer coupler socket and a lock apparatus. The lock apparatus includes a base that has a socket engagement feature that is receivable within the trailer coupler socket. The base further includes a locking assembly that includes a locking mechanism, a user interface operable to actuate the locking mechanism, and a first and a second rotatable member coupled to the locking mechanism, with a rotational axis extending through the first and second rotatable members. The system further includes a pivoting shackle that has a middle section disposed between a first end section and a second end section. The first end section is coupled to the first rotatable member and the second end section is coupled to the second rotatable member, with the pivoting shackle being pivotable about the rotational axis between at least a locked position and an unlocked position.

In one implementation, the pivoting shackle includes a side profile, as visible from a perspective looking substantially parallel to the rotational axis, that is "L" shaped. When the pivoting shackle is in the locked position, at least a portion of the middle section of the pivoting shackle may be rearward an exterior surface summit of the trailer coupler socket. In one implementation, at least a portion of a top surface of the base is contacting an underside of the trailer coupler. In one implementation, an outer periphery a top surface of the base does not extend beyond a lip of the trailer coupler. The lock apparatus may be manufactured specifically for the trailer coupler or the lock apparatus may be retrofitted with the trailer coupler and may be retrofittable with a plurality of other trailer couplers.

Also disclosed herein is a method for locking a trailer coupler. The method includes providing a trailer that has a trailer coupler with a trailer coupler socket. The method further includes providing a lock apparatus that includes a base with a socket engagement feature and a locking assembly. The locking assembly includes a locking mechanism, a user interface operable to actuate the locking mechanism, and a first and a second rotatable member coupled to the locking mechanism, with a rotational axis extending through the first and second rotatable members. The provided lock apparatus further includes a pivoting shackle that has a middle section disposed between a first end section and a second end section. The method further includes inserting the socket engagement feature into the trailer coupler socket, pivoting at the pivoting shackle to position the lock apparatus in a locked position, and actuating the locking mechanism to secure the lock apparatus in the locked position.

In one implementation, pivoting the pivoting shackle includes moving at least a portion of the middle section of the pivoting shackle to a position rearward an exterior surface summit of the trailer coupler socket, wherein at least the portion of the middle section and the first and second rotating members are on opposite sides of a central axis of the socket engagement feature. In one implementation, the pivoting shackle has a side profile, as visible from a perspective looking substantially parallel to the rotational axis, that is "L" shaped. Pivoting the pivoting shackle may include moving at least a portion of the pivoting shackle in a substantially downward vertical direction.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
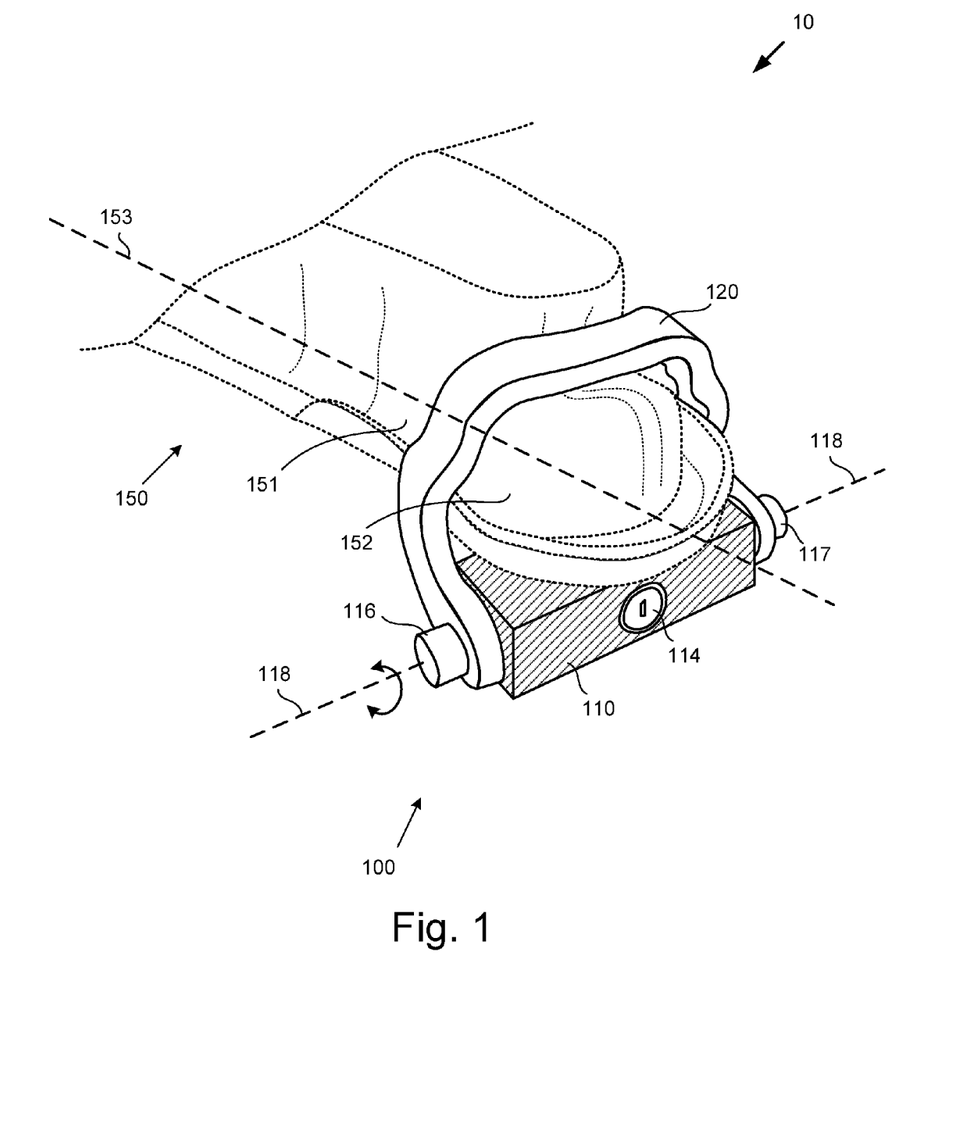
FIG. 1 is a perspective view of one embodiment of a trailer coupler locking system.

FIG. 1 is a perspective view of one embodiment of a trailer coupler locking system 10. As briefly described above in the background section, conventional trailer coupler lock devices have various failings and shortcomings. As described below with reference to the figures, the lock apparatus 100 of the present disclosure overcomes many of the failings and shortcomings of the prior art devices.

The lock apparatus 100 is engageable with a trailer 150. The trailer 150 on which the lock apparatus 100 is engaged may be any one of various types trailers 150. The trailer 150 includes a trailer coupler portion 151 that has a trailer coupler socket 152. The lock apparatus 100 includes a base 110 and a pivoting shackle 120. The base 110 includes a socket engagement feature 211 (see FIG. 2) and a locking assembly. The locking assembly, according to one embodiment, may include an internal/integrated locking mechanism (not shown in FIG. 1). The locking mechanism is coupled to a user interface 114, via which a user is able to actuate (i.e. engage and disengage) the locking mechanism.

The locking mechanism is also coupled to a first rotating member 116 and a second rotating member 117. These rotating members 116, 117 are coupled to the pivoting shackle 120 so that the pivoting shackle 120 is rotatable/pivotable over an exterior surface of the trailer coupler socket 152. The pivoting shackle 120, when locked over the exterior surface of the trailer coupler socket 152, securely holds the socket engagement feature 211 within the trailer coupler socket 152, thus preventing a thief from coupling a trailer hitch to the unattended and unhitched trailer 150.

FIG. 1 also depicts a longitudinal axis 153 of the trailer 150 and a rotational axis 118 of the locking assembly. In one embodiment, the rotational axis 118 of the locking assembly is perpendicular to the longitudinal axis 153 of the trailer 150. In such an embodiment, the pivoting shackle 120 is rotatable in a direction that is substantially parallel to the longitudinal axis 153 of the trailer 150.

Figure 2:
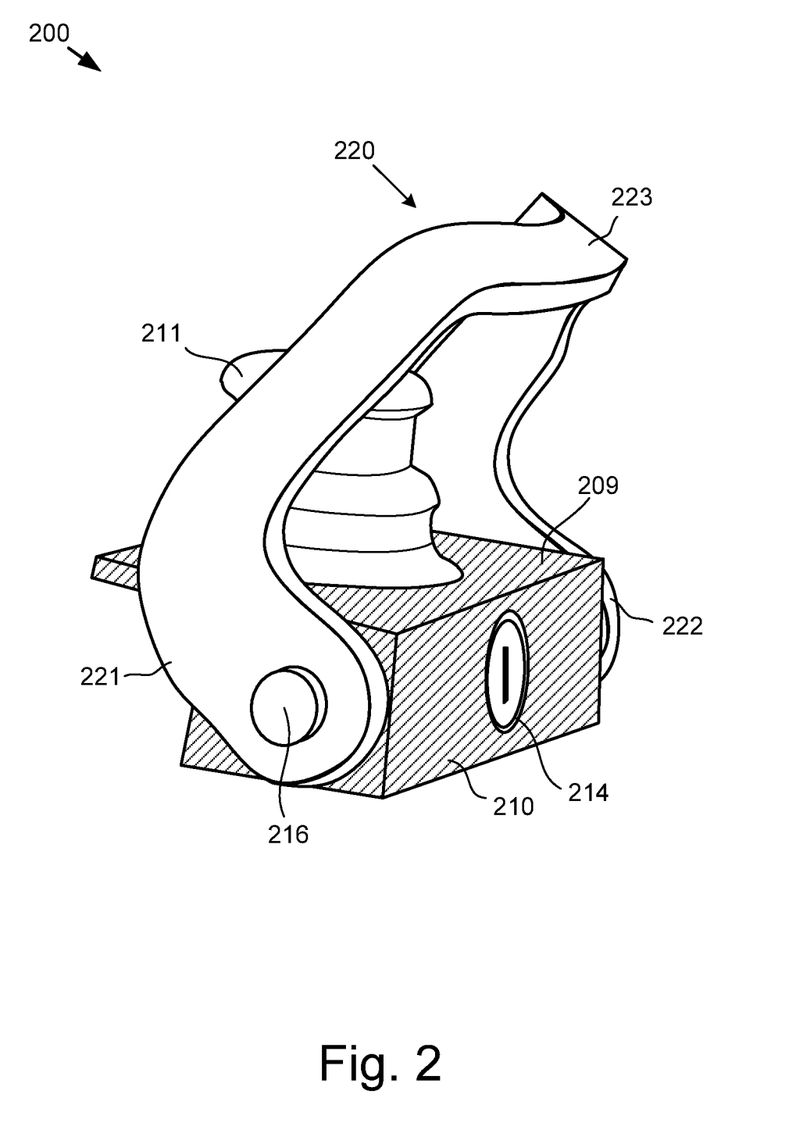
FIG. 2 is a perspective view of one embodiment of a lock apparatus for a trailer coupler.

FIG. 2 is a perspective view of one embodiment of the lock apparatus 200 for locking a trailer coupler. As described above, the lock apparatus 200 includes the base 210 and the pivoting shackle 220. The socket engagement feature 211 of the base 210 may be implemented to have various shapes and/or designs. For example, the socket engagement feature 211 may have a shape/design that is specifically tailored for a certain trailer coupler socket 152. In another embodiment, the socket engagement feature 211 is specifically designed to be receivable within a plurality of different trailer coupler sockets. The socket engagement feature, for example, may be a spherical ball. In another embodiment, the socket engagement feature is a protruding cylindrical member. In another embodiment, the socket engagement feature may simply be a vertical shaft extending from the top surface 209 of the base 210. The top surface 209 of the base 210, as described below in greater detail with reference to FIGS. 4A and 4B, engages/contacts and underside of the trailer coupler when the lock apparatus 200 is in a locked position. In other words, the engagement of the pivoting shackle 220 on the top surface of trailer coupler maintains the socket engagement feature 211 within the trailer coupler socket.

The locking mechanism (not depicted in FIG. 2), according to one embodiment, is internal and integrated with the base 210. However, in another embodiment, the locking mechanism may be external to the base 210. The locking mechanism may be any one of various types of locking assemblies. For example, the locking mechanism may be a pin tumbler lock, a rotary combination lock, a warded lock, a wafer tumbler lock, a disc tumbler lock, and/or a lever tumbler lock. The locking mechanism may further include a ratcheting assembly that allows the pivoting shackle 222 be pivotally positionable and lockable about the rotational axis in a plurality of discrete angular positions. Accordingly, the locking mechanism may include various auxiliary/secondary mechanical components, such as spring-loaded elements and gears, that facilitate and/or improve the operability of the lock apparatus. For example, in another embodiment the locking mechanism may include an audible position feedback mechanism that indicates to the user pivoting movement of the pivoting shackle about the rotational axis.

As described above, the locking mechanism is coupled to a first and a second rotating member 216, 217. In one embodiment, the locking mechanism is directly coupled to both rotating members 216, 217. In other words, actuation of the locking mechanism, via the user interface 214, actively affects/engages both the first and the second rotating member 216, 217. In another embodiment, the locking mechanism may only be directly coupled to one of the rotating members 216, 217, thus actuation of the locking mechanism actively affects/engages one of the rotating members while the other is merely passively rotatable/pivotable about the rotational axis. In one embodiment, the first and second rotating members 216, 217 may be restrictively rotatable/pivotable. In other words, the base 210 and/or the locking mechanism may include rotational stops or rotational limiters that prevent the first and second rotating members 216, 217 from pivoting beyond a certain angular range.

The user interface 214 may be any interface via which a user can actuate the locking and unlocking of the lock apparatus 200. For example, the user interface may be a keyhole, a rotary combination lock, a key card sensor, and RFID card sensor, and NFC sensor, a biometric sensor, security token, and/or a touchscreen. It is expected that one of ordinary skill in the art will recognize other types of locking assemblies and user actuation interfaces that may be implemented as the locking mechanism and the user interface 214, respectively.

The pivoting shackle 220, in one embodiment, has a middle section 223 disposed between a first end section 221 and a second end section 222. In one embodiment the pivoting shackle is a single, unitary piece of material. In another embodiment, the pivoting shackle 220 may be made from several different pieces of material that are permanently affixed together (i.e. welding, adhesives etc.). In one embodiment the first end section 221 is coupled to the first rotating member 216 and the second end section 222 is coupled to the second rotating member. In FIGS. 1 and 2, the first and second rotating members are depicted as protrusions extending laterally from the base through the pivoting shackle. However, in one embodiment the first and second rotating members may be disposed within the base and the first and second end sections of the pivoting shackle may extend partially within the base to couple with the rotating members. In a further embodiment, the first and second rotating members may not actually be components of the base 210, but instead the first and second rotating members may be components of the pivoting shackle 220. In other words, the first and second rotating members, as defined herein, are the elements mechanically engaged with the locking mechanism that mechanically couple the pivoting shackle 222 to the locking mechanism. The pivoting shackle 220, as described in greater detail below with reference to the remaining figures, may have various shapes, profiles, and/or structural configurations.

The components of the lock apparatus 200 may be constructed of various materials. For example, the various components of the lock apparatus 200 may be constructed of a metallic material, a polymer composite material, or any other durable and strong material that is capable of securely locking and maintaining the lock apparatus 200 in place. In one embodiment, the material from which the lock apparatus 200 is constructed is sufficiently strong so as to not fail (i.e. fracture, bend, deform) when a thief attempts to pry and/or remove the lock apparatus from the trailer coupler. It is expected that one of ordinary skill in the art will recognize suitable materials from which the lock apparatus 200 may be constructed.

Figure 3A:
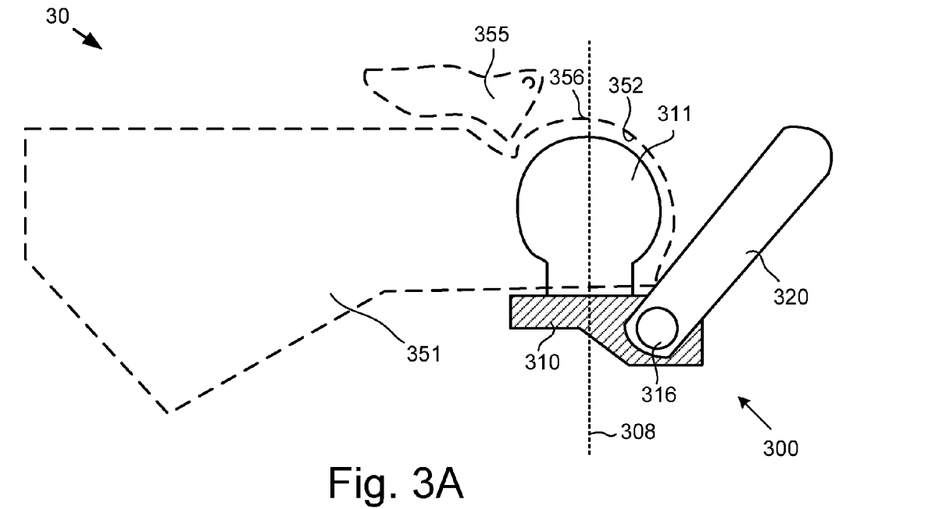
FIG. 3A is a side view of one embodiment of a lock apparatus in an unlocked position with respect to a trailer coupler.

FIG. 3A is a side view of one embodiment of the lock apparatus 300 in an unlocked position 30 with respect to the trailer coupler 351. The trailer coupler 351 may include a socket lock 355 and other peripheral elements. The trailer coupler 351, as described above, includes a trailer coupler socket 352 within which a trailer hitch is received for towing the trailer. The socket engagement feature 311, depicted as a spherical ball in FIG. 3A, is positioned within the trailer coupler socket 352. The pivoting shackle 320 is pivotably coupled to the base 310 via the first rotating member 316 and the second rotating member. In the unlocked position 30, the pivoting shackle 320 is not yet positioned over/around the trailer coupler socket 352. The pinnacle or the highest point on the exterior surface of the trailer coupler socket is defined and described herein as the summit 356 of the trailer coupler socket. FIG. 3A also depicts a central axis 308 of the socket engagement feature 311.

Figure 3B:
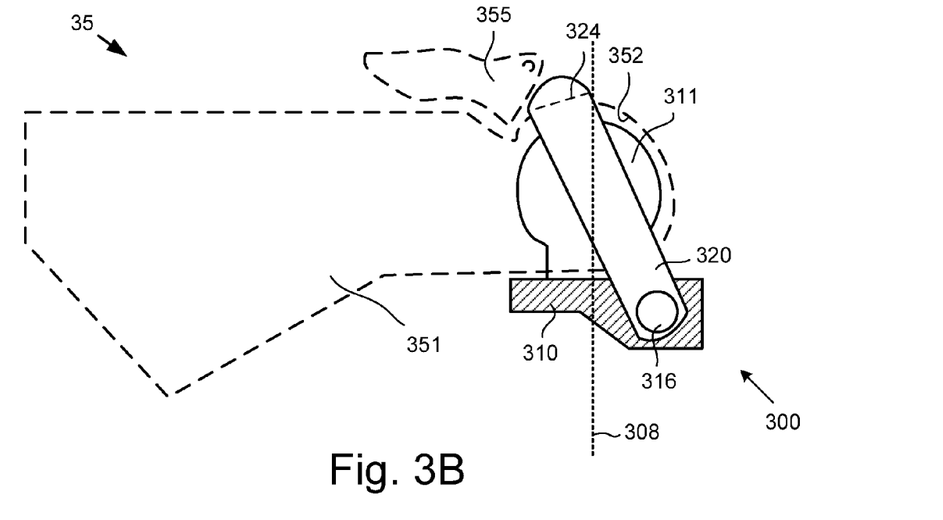
FIG. 3B is a side view of one embodiment of the lock apparatus of FIG. 3A in a locked position with respect to the trailer coupler.

FIG. 3B is a side view of one embodiment of the lock apparatus 300 of FIG. 3A in a locked position 35 with respect to the trailer coupler 351. When in the locked position 35, the pivoting shackle 320 has been rotated over the exterior surface of the trailer coupler socket 352 to engage the exterior surface of the trailer coupler socket 352, thereby holding and securing the socket engagement feature 311 in place within the trailer coupler socket 352. The pivoting shackle 320 may include an engagement surface 324 on at least a portion of an underside of the middle section of the pivoting shackle 320. This engagement surface 324 may be specifically configured to engage with and/or make contact with a specific type/shape of trailer coupler 351. For example the engagement surface 324 may be an angled/beveled surface. In another embodiment, the engagement surface 324 may further include a gripping liner, such as a rubber or other suitable material, that improves the secure engagement and contact between the pivoting shackle 320 and the exterior surface of the trailer coupler socket 352.

In one embodiment, the lock apparatus 300 is defined to be in the locked position 35 when the pivoting shackle 320 is rotated far enough over the exterior surface of the trailer coupler socket 352 so that at least a portion of the middle section of the pivoting shackle 320 is rearward of the summit 356. In another embodiment, the locked position 35 is when the pivoting shackle is rotated over the exterior surface of the trailer coupler socket 352 to the extent that at least a portion of the middle section of the pivoting shackle 320 is opposite the central axis 308 of the first rotating member 316 and the second rotating member.

The design of the lock apparatus, specifically the shape and design of the pivoting shackle, may be configured to work with a variety of trailer couplers. For example, the pivoting shackle may be lockable about trailer couplers of different shapes and sizes. In one embodiment, as briefly described above, the lock apparatus may be configured to lock about a specific trailer coupler and may be designed, sized, and shaped accordingly. However, in another embodiment, the lock apparatus may be able to easily and quickly lock about both large and comparatively smaller trailer couplers. Because the pivoting shackle rotates around the exterior surface of the trailer coupler in a rearward direction, a specific pivoting shackle may be substantially universal with respect to which types of trailer couplers about which it can lock.

Figure 4A:
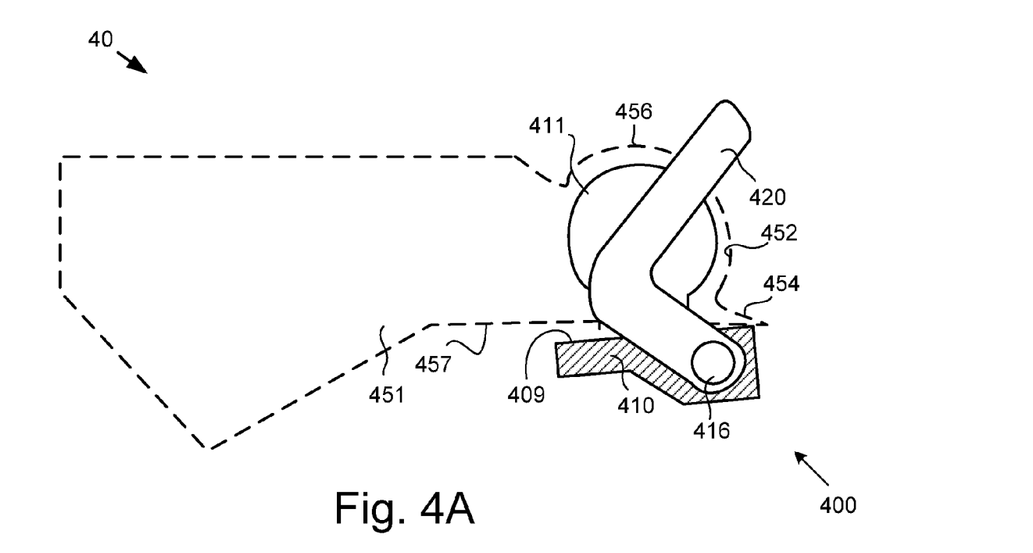
FIG. 4A is a side view of another embodiment of a lock apparatus in an unlocked position with respect to a trailer coupler, the lock apparatus having a side profile that is "L" shaped.

FIG. 4A is a side view of another embodiment of lock apparatus 400 in the unlocked position 40 with respect to a trailer coupler 451, the lock apparatus 400 having a side profile that is "L" shaped. As used herein, the term "side profile" refers to the shape and configuration of the pivoting shackle 420 as viewed from the perspective shown in FIGS. 3A-4B. The angle of the bend in the "L" shaped side profile of the pivoting shackle 420 may be selected and configured according to the specifics of a given application. For example, depending on the dimensions and size of the trailer coupler socket 452, the pivoting shackle 420 may have an "L" shaped side profile that has a bend angle that is greater than or less than 90°. Also, the bend angle may be more gradual, and the side profile may resemble a curved bow shape.

The trailer coupler 451, as described above, includes a trailer coupler socket 452 within which a trailer hitch is receivable for towing the trailer. The socket engagement feature 411, once again depicted as a spherical ball in FIG. 4A, is positioned within the trailer coupler socket 452. The pivoting shackle 420 is pivotably coupled to the base 410 via the first rotating member 416 and the second rotating member. In the unlocked position 40, the pivoting shackle 420 is not yet positioned over/around the trailer coupler socket 452.

Figure 4B:
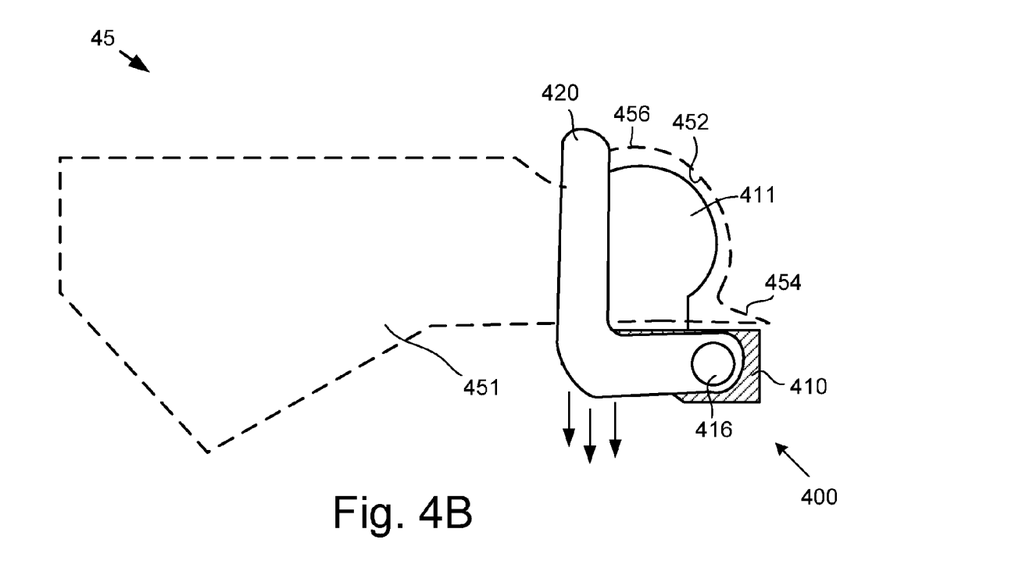
FIG. 4B is a side view one embodiment of the lock apparatus of FIG. 4A in a locked position with respect to the trailer coupler.

FIG. 4B is a side view of one embodiment of the lock apparatus 400 of FIG. 4A in the locked position 45 with respect to the trailer coupler 451. When in the locked position 45, the pivoting shackle 420 has been rotated over the exterior surface of the trailer coupler socket 452 to engage the exterior surface of the trailer coupler socket 452, thereby holding and securing the socket engagement feature 411 in place within the trailer coupler socket 452. In one embodiment, the lock apparatus 400 is in the locked position 45 when the pivoting shackle 420 is rotatable far enough over the exterior surface of the trailer coupler socket 452 so that at least a portion of the pivoting shackle 420 is movable in a substantially downward vertical direction. As depicted in FIG. 4B, the vertical direction arrows show the downward movement of at least a portion of the pivoting shackle 420 just before the pivoting shackle 420 engages the top exterior surface of the trailer coupler socket 452. The "L" shaped side profile of the pivoting shackle 420 enables this downward movement, thus potentially promoting the degree of secure engagement between the pivoting shackle 420 and the trailer coupler.

In other words, the pivoting shackle 420 clamps around the trailer coupler socket 452 to hold the lock apparatus 400 securely in place. Accordingly, in one embodiment, the lock apparatus 400 is able to clamp around the trailer coupler socket 452 and tightly hold the top surface 409 of the base 410 to an underside for 57 of the trailer coupler 451. In such an embodiment, with the top surface 409 of the base 410 firmly and directly engaged with the underside 457 of the trailer coupler 451, a thief is prevented from inserting a prybar or crowbar in between the base 410 and the trailer coupler 451, thus decreasing the likelihood that the thief will be able to bend, deform, or break the lock apparatus 400 in an attempt to steal the trailer. As a further benefit of maintaining a tight engagement between the base 410 and the trailer coupler 451, a typical user generally prefers the appearance of the lock apparatus 400 when the lock apparatus 400 is tightly and securely engaged upon the trailer coupler 451.

FIGS. 4A and 4B also show a trailer coupler 451 that includes a peripheral lip 454. In one embodiment, the base 410 of the lock apparatus 400 has a lateral outer periphery that fits within (i.e. is smaller than) the peripheral lip 454 of the trailer coupler 451. In such embodiment, since the top surface 409 of the base 410 does not extend beyond the peripheral lip 454 of the trailer coupler 451, a thief is unable, for example, to use a hammer to strike the base 410 in a downward direction. In other words, the lack of a laterally protruding top surface 409 of the base 410 diminishes the likelihood of a thief being able to damage or break the lock apparatus 400 by applying a downward force.

Figure 5:
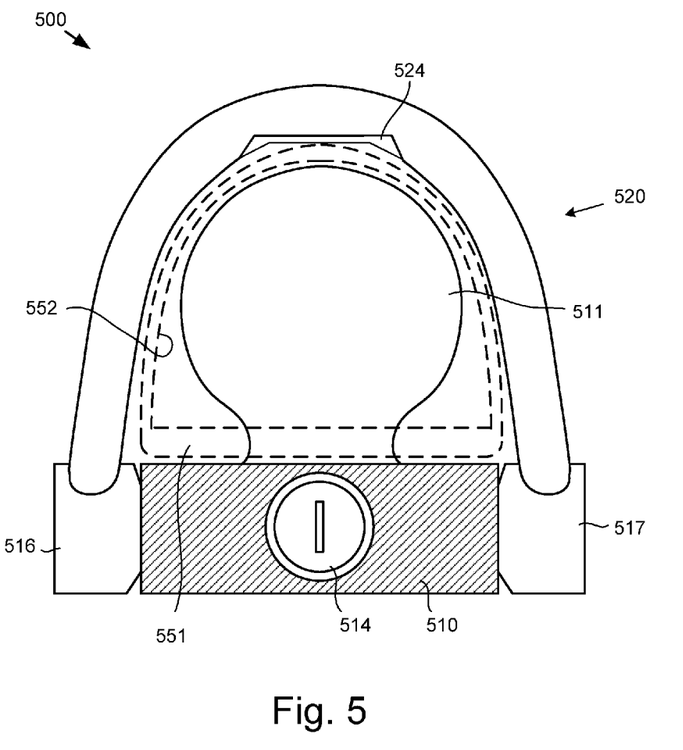
FIG. 5 is a front view of one embodiment of a lock apparatus engaged on a trailer coupler, with the lock apparatus having a front profile that is "U" shaped.

FIG. 5 is a front view of one embodiment of the lock apparatus 500 engaged on a trailer coupler 551, the lock apparatus having a front profile that is "U" shaped. The term "front profile" refers to the shape/configuration of the pivoting shackle 520 as a visible from the perspective shown in FIG. 5. As mentioned, in one embodiment the pivoting shackle 520 has a substantially "U" shaped front profile. Also as described above, the pivoting shackle 520 may include an engagement surface 524 that facilitates the engagement between the exterior surface of the trailer coupler socket in the pivoting shackle 520. As shown in FIG. 5, the engagement surface 524 may be a beveled or slanted underside of the pivoting shackle 520. Also as previously described, the socket engagement feature 511 of the base 510 may be a spherical ball. The first and second rotating members 516, 517 may be rotating cylinders on each lateral side of the base 510, wherein each rotating cylinder includes a tapered section that is disposed within the base 510 and that engages the locking mechanism. The user interface 514 as described above may be a keyhole into which a user can inserts a key to actuate the locking mechanism.

Figure 6:
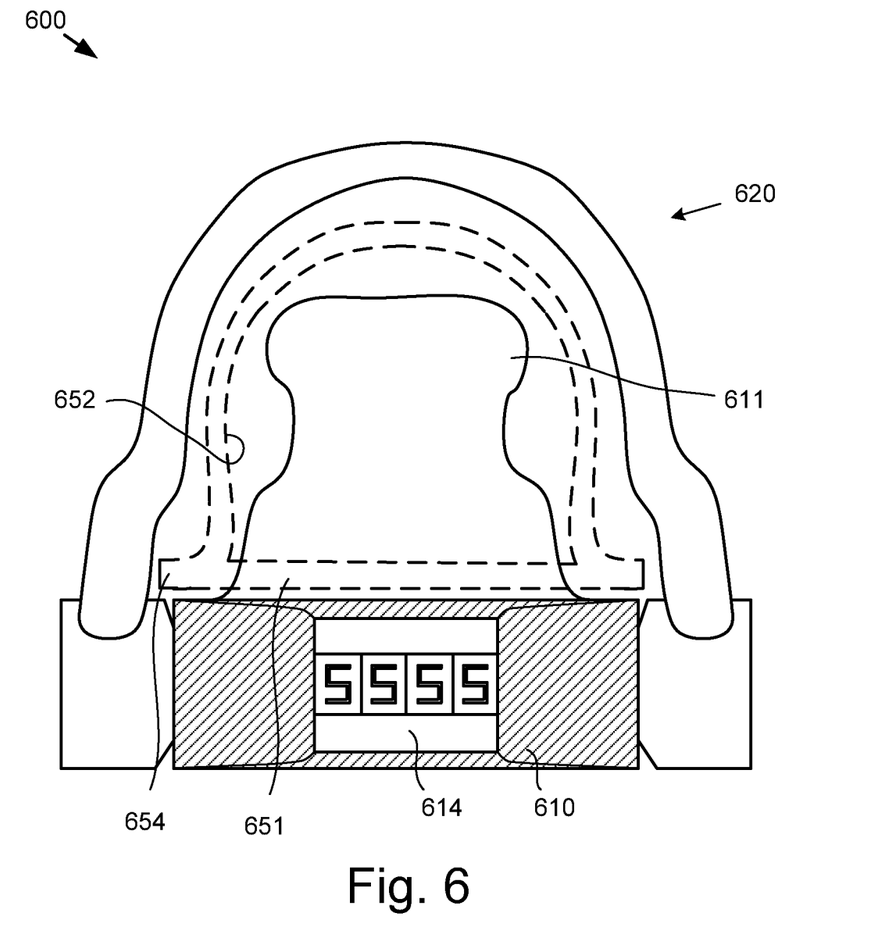
FIG. 6 is a front view of another embodiment of a lock apparatus engaged on a trailer coupler, the lock apparatus having a front profile that is contoured.

FIG. 6 is a front view of another embodiment of the lock apparatus 600 engaged on a trailer coupler 651, the lock apparatus having a front profile that is contoured or undulating. In the depicted embodiment, the trailer coupler 651 includes a lip 654. In one embodiment, in order to prevent excessive amounts of void space between the exterior surface of the trailer coupler socket in the pivoting shackle 620, the front profile of the pivoting shackle 620 may bend inwards to more closely contour the shape of the exterior surface of the trailer coupler socket. It is expected that in other embodiments, the front profile of the pivoting shackle may have other shapes that contour/conform with specifically shaped trailer coupler sockets. Also depicted in FIG. 6 is a user interface 614 that includes a numerical rotary code interface. The rotary code interface may be operably coupled to an internal locking mechanism so that the locking mechanism is actuatable upon a user entering the correct code via the user interface 614. FIG. 6 also depicts one embodiment of the socket engagement feature 611 that is a vertical protrusion with a dome-shaped top surface.

Figure 7:
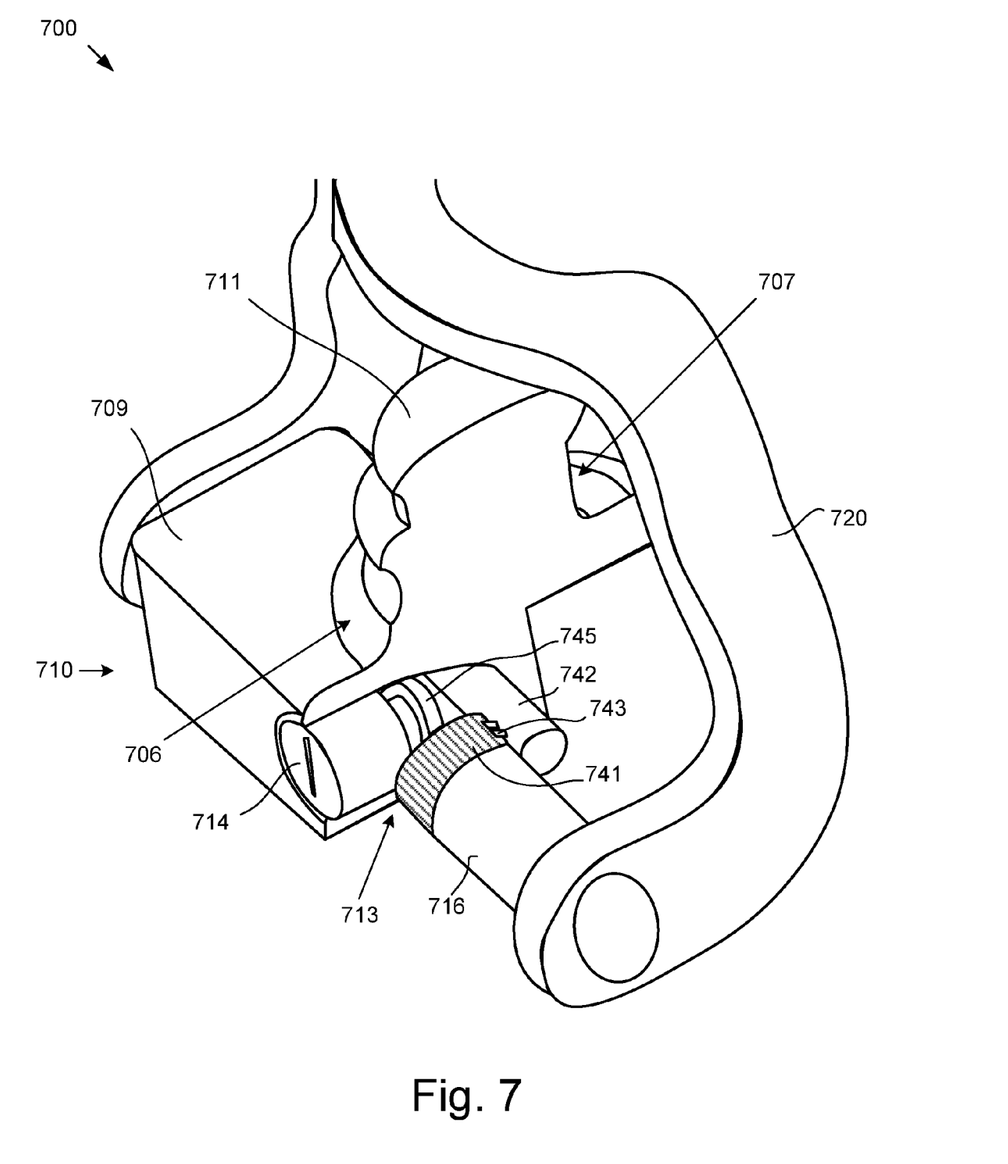
FIG. 7 is a partial cut-away perspective view of one embodiment of the locking mechanism of the lock apparatus.

FIG. 7 is a partial cut-away perspective view of one embodiment of the locking mechanism 713 of the lock apparatus 700. The base 710, according to one embodiment, may include a socket engagement feature 711 that has a front surface profile 706 that is different than the rear surface profile 707. In other words, the exterior surface of the socket engagement feature 711 may have different contour patterns. As depicted in FIG. 7, the socket engagement feature 711 is dome-like and the front surface profile 706 has an undulating peripheral profile while the back surface profile 706 is substantially non-undulated. Such an implementation may facilitate the secure engagement between the top surface 709 of the lock apparatus 700 and the coupler socket, depending on the specifics of a given application.

As described above, the locking assembly may include any of various locking mechanisms 713. In the depicted embodiment, the locking mechanism 713 includes a first rotating member 716 that is coupled to the shackle 720 at one end and that has a cogged peripheral surface 741 at the other end. The cogged peripheral surface 741 is mechanically engaged with one or more teeth 743 that protrude from an actuator bar 742. The actuator bar 742 is coupled to the user interface 714 (i.e., keyhole, etc) via a cylinder. In other words, a user may actuate the locking mechanism 713 by inserting a key (or entering a code, etc) into the user interface 714 and rotating the key. The rotation of the key causes the cylinder to rotate, which in turn operably engages the actuator bar to at least partially disengage the teeth 743 from the cogged peripheral surface 741 of the rotating member 716. In one embodiment, the teeth 743 are not completely disengaged from the cogged surface 741, but instead allow the rotating member 716 to rotate in a ratcheting fashion, thus allowing the shackle 720 to be ratcheted, with audible or palpable feedback, to a desired locked position. Once in the desired position, the locking mechanism may be actuated to reengaged the teeth 743 with the cogged surface 741.

As described above, the locking mechanism may be any of various types of locking assemblies. For example, the locking mechanism may be a pin tumbler lock, a rotary combination lock, a warded lock, a wafer tumbler lock, a disc tumbler lock, and/or a lever tumbler lock. The locking mechanism may further include a ratcheting assembly that allows the shackle to be pivotally positionable and lockable about the rotational axis in a plurality of discrete angular positions and may provide audible and/or palpable feedback as the user rotates the shackle. Accordingly, the locking mechanism may include various auxiliary/secondary mechanical components, such as spring-loaded elements and gears, that facilitate and/or improve the operability of the lock apparatus.

Figure 8:
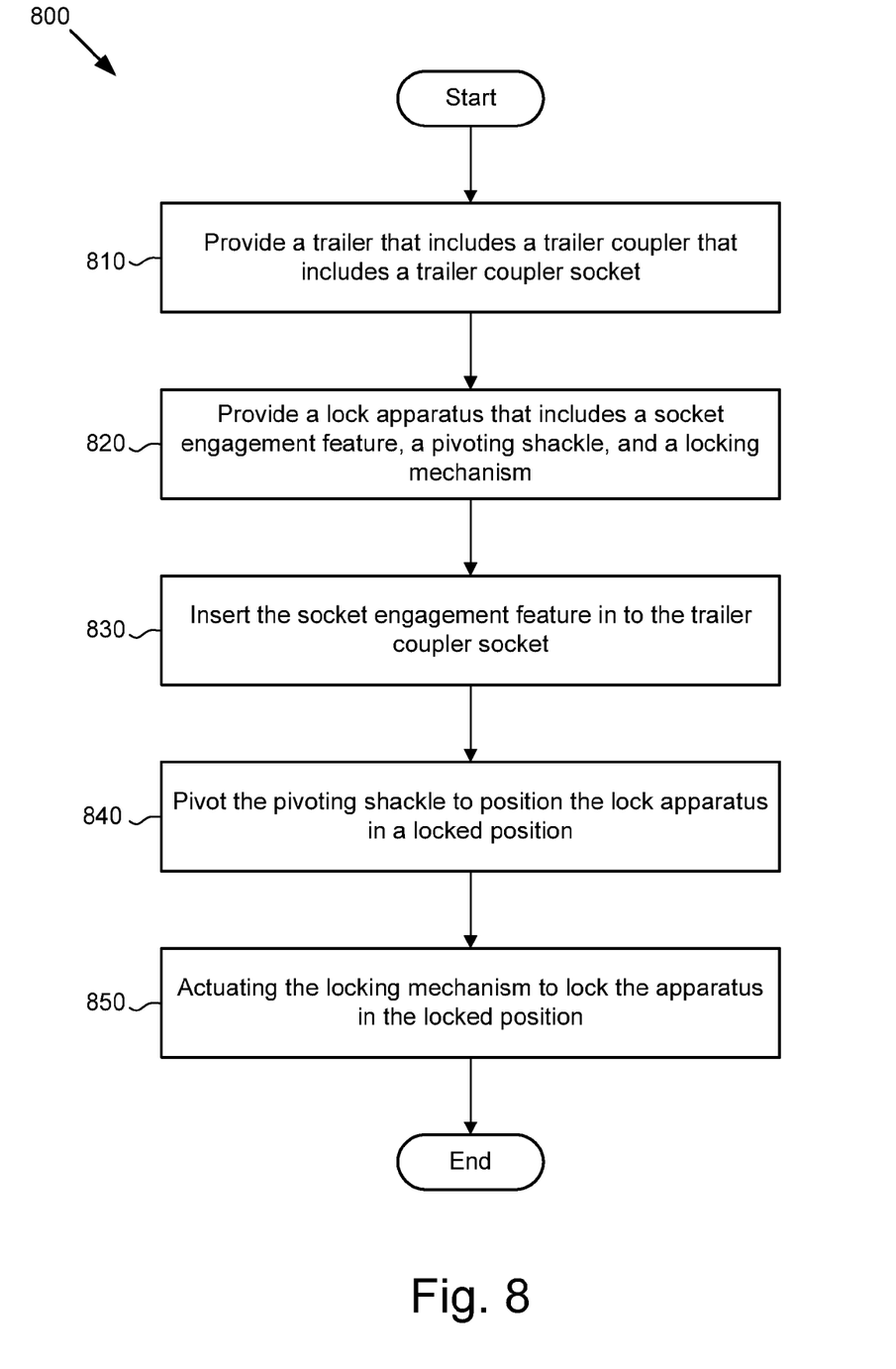
FIG. 8 is a schematic flow chart diagram of one embodiment of a method for locking a trailer coupler.

FIG. 8 is a schematic flow chart diagram of one embodiment of a method 800 for locking a trailer coupler. The method 800 includes, in one embodiment, providing a trailer that includes a trailer coupler that has a trailer coupler socket at 810. The method 800 further includes providing a lock apparatus that includes a base and a pivoting shackle at 820. As described above, the base includes a socket engagement feature and a locking assembly. The locking assembly, according to one embodiment, includes a locking mechanism, a user interface that is operable to actuate the locking mechanism, a first rotatable member, and a second rotatable member. The first and second rotatable members form a rotational axis about which the pivoting shackle is rotatable.

The first and second rotatable members are coupled to the locking mechanism. The first and second rotatable members are also coupled to a first end section and a second end section of the pivoting shackle, respectively. Disposed between the first end section and the second end section of the pivoting shackle is the middle section. As described above, these sections of the pivoting shackle may, in one embodiment, not represent physically distinguishable sections but instead may represent regions of a unitary material that together form the pivoting shackle.

The method 800 further includes inserting the socket engagement feature of the base into the trailer coupler socket at 830 and pivoting the pivoting shackle about the rotational axis to engage at least a portion of the middle section of the pivoting shackle on the exterior surface of the trailer coupler socket at 840. Once the pivoting shackle is in the locked position, the method 800 further includes actuating the locking mechanism to secure the lock apparatus in the locked position at 850. The term "locked position" not only includes the orientation and position of the pivoting shackle, but the term "locked position" includes the position, angle, orientation, and/or alignment of the base with respect to the trailer coupler. In other words, the locked engagement between the middle section of the pivoting shackle and the exterior surface of the trailer coupler socket securely holds the socket engagement feature within the trailer coupler socket, thereby preventing a thief from stealing the trailer.

The method 800 may further include other steps. For example, pivoting the pivoting shackle at 840 may require a preceding actuation step where the locking mechanism, via the user interface, is actuated to allow the pivoting shackle to move into the locked position. In other words, for example, the locking mechanism may be configured so that actuation via the user interface is required to perform any pivoting movement of the pivoting shackle. In a further embodiment, as described above, the locking mechanism may include a ratcheting assembly, whereby the pivoting shackle is freely movable in a first direction (i.e., in a locking direction) but requires user actuation via the user interface to move the pivoting shackle in the opposite direction (i.e., in an unlocking direction).

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A lock apparatus for a trailer coupler, comprising:
a base comprising a socket engagement feature, wherein the socket engagement feature is receivable within a trailer coupler socket;
the base further comprising a locking assembly, wherein the locking assembly comprises a locking mechanism, a user interface operable to actuate the locking mechanism, and a first and a second rotatable member coupled to the locking mechanism, wherein the locking assembly is located between the first and second rotatable members and on a rotational axis which extends through the first and second rotatable members; and
a pivoting shackle comprising a middle section disposed between a first end section and a second end section, wherein the first end section is coupled to the first rotatable member and the second end section is coupled to the second rotatable member, wherein the pivoting shackle is pivotable about the rotational axis between at least a locked position and an unlocked position.

2. The apparatus of claim 1, wherein the rotational axis is substantially non-parallel to a longitudinal axis of the trailer coupler.

3. The apparatus of claim 2, wherein the pivoting shackle comprises a front profile, as visible from a perspective looking substantially perpendicular to the rotational axis and substantially parallel to the longitudinal axis of the trailer coupler, wherein the front profile of the pivoting shackle comprises a "U" shape.

4. The apparatus of claim 2, wherein the pivoting shackle comprises a front profile, as visible from a perspective looking substantially perpendicular to the rotational axis and substantially parallel to the longitudinal axis of the trailer coupler, wherein the front profile of the pivoting shackle comprises a contour shape that substantially follows a contour of an exterior surface of the trailer coupler socket.

5. The apparatus of claim 1, wherein the pivoting shackle comprises a side profile, as visible from a perspective looking substantially parallel to the rotational axis, wherein the side profile of the pivoting shackle comprises an "L" shape.

6. The apparatus of claim 1, wherein at least the middle section of the pivoting shackle comprises an engagement surface that is adapted to engage an exterior surface of the trailer coupler socket.

7. The apparatus of claim 1, wherein the locking mechanism is integrated within the base.

8. The apparatus of claim 1, wherein the locking mechanism comprises a ratchet structure that is lockable in a plurality of positions.

9. The apparatus of claim 1, wherein the locking mechanism is selected from a group consisting of: a pin tumbler lock, a combination lock, a warded lock, a wafer tumbler lock, a disc tumbler lock, and a lever tumbler lock.

10. The apparatus of claim 1, wherein the user interface is selected from a group consisting of: a key-hole, a combination, a key-card, an RFID card, an NFC device, a biometric sensor, a security token, and a touch-screen.

11. A trailer coupler locking system, comprising:
a trailer comprising a trailer coupler comprising a trailer coupler socket; and
a lock apparatus comprising:
a base comprising a socket engagement feature, wherein the socket engagement feature is receivable within the trailer coupler socket;
the base further comprising a locking assembly, wherein the locking assembly comprises a locking mechanism, a user interface operable to actuate the locking mechanism, and a first and a second rotatable member coupled to the locking mechanism, wherein the locking assembly is located between the first and second rotatable members and on a rotational axis which extends through the first and second rotatable members; and
a pivoting shackle comprising a middle section disposed between a first end section and a second end section, wherein the first end section is coupled to the first rotatable member and the second end section is coupled to the second rotatable member, wherein the pivoting shackle is pivotable about the rotational axis between at least a locked position and an unlocked position.

12. The system of claim 11, wherein the pivoting shackle comprises a side profile, as visible from a perspective looking substantially parallel to the rotational axis, wherein the side profile of the pivoting shackle comprises an "L" shape.

13. The system of claim 11, wherein, when the pivoting shackle is in the locked position, at least a portion of the middle section of the pivoting shackle is rearward an exterior surface summit of the trailer coupler socket.

14. The system of claim 13, wherein at least a portion of a top surface of the base is contacting an underside of the trailer coupler.

15. The system of claim 11, wherein an outer periphery of a top surface of the base does not extend beyond a lip of the trailer coupler.

16. The system of claim 11, wherein at least one of the pivoting shackle and the socket engagement feature comprises a geometry specific to the trailer coupler.

17. The system of claim 11, wherein at least one of the pivoting shackle and the socket engagement feature comprises a geometry compatible to engage the trailer coupler and a plurality of other trailer couplers.

18. A method for locking a trailer coupler, comprising:

providing a trailer comprising a trailer coupler comprising a trailer coupler socket;

providing a lock apparatus comprising:

a base comprising a socket engagement feature;

the base further comprising a locking assembly, wherein the locking assembly comprises a locking mechanism, a user interface operable to actuate the locking mechanism, and a first and a second rotatable member coupled to the locking mechanism, wherein the locking assembly is located between the first and second rotatable members and on a rotational axis which extends through the first and second rotatable members; and a pivoting shackle comprising a middle section disposed between a first end section and a second end section, wherein the first end section is coupled to the first rotatable member and the second end section is coupled to the second rotatable member, wherein the pivoting shackle is pivotable about the rotational axis;

inserting the socket engagement feature into the trailer coupler socket;

pivoting at the pivoting shackle to position the lock apparatus in a locked position; and actuating the locking mechanism to secure the lock apparatus in the locked position.

19. The method of claim 18, wherein pivoting the pivoting shackle comprises moving at least a portion of the middle section of the pivoting shackle to a position rearward an exterior surface summit of the trailer coupler socket, wherein at least the portion of the middle section and the first and second rotating members are on opposite sides of a central axis of the socket engagement feature.

20. The method of claim 18, wherein the pivoting shackle comprises a side profile, as visible from a perspective looking substantially parallel to the rotational axis, wherein the side profile of the pivoting shackle comprises an "L" shape, wherein pivoting the pivoting shackle comprises moving at least a portion of the pivoting shackle in a substantially downward vertical direction.

* * * * *